(12) United States Patent
Oosawa

(10) Patent No.: US 7,324,660 B2
(45) Date of Patent: Jan. 29, 2008

(54) IMAGE POSITION MATCHING APPARATUS AND IMAGE PROCESSING APPARATUS

(75) Inventor: Akira Oosawa, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 424 days.

(21) Appl. No.: 10/228,303

(22) Filed: Aug. 27, 2002

(65) Prior Publication Data
US 2003/0039405 A1    Feb. 27, 2003

(30) Foreign Application Priority Data
Aug. 27, 2001  (JP) .............................. 2001-255505
May 9, 2002    (JP) .............................. 2002-133555

(51) Int. Cl.
*G06K 9/00* (2006.01)

(52) U.S. Cl. ...................... 382/100; 382/130; 382/293; 382/284; 382/294

(58) Field of Classification Search ........ 382/128–132, 382/293–296, 298, 299, 284, 294
See application file for complete search history.

(56) References Cited

U.S. PATENT DOCUMENTS

| | | |
|---|---|---|
| 5,359,513 A | 10/1994 | Kano et al. |
| 5,490,221 A * | 2/1996 | Ransford et al. ........... 382/130 |
| 5,982,915 A | 11/1999 | Doi et al. |
| 6,144,759 A * | 11/2000 | Weese et al. ............... 382/132 |
| 7,043,066 B1 * | 5/2006 | Doi et al. .................... 382/132 |
| 2001/0036303 A1 * | 11/2001 | Maurincomme et al. .... 382/132 |

FOREIGN PATENT DOCUMENTS

| | | |
|---|---|---|
| JP | 7-37074 | 2/1995 |
| JP | 11-342900 | 12/1999 |
| JP | 2001-44623 | 2/2001 |
| JP | 2001-129554 | 5/2001 |
| JP | 2001-325584 | 11/2001 |

* cited by examiner

*Primary Examiner*—Matthew C. Bella
*Assistant Examiner*—Shefali Patel
(74) *Attorney, Agent, or Firm*—Sughrue Mion, PLLC

(57) ABSTRACT

An image position matching apparatus and an image processing apparatus capable of accurately matching the positions of a three-dimensional past image and a two-dimensional present image, even for cases in which fluctuation in the position of the subject has occurred when the respective images were obtained. An image reducing means reduces to 1/10 size a three-dimensional past image data and a two-dimensional current image data that have been inputted thereto. The reduced three-dimensional past image data and the reduced two-dimensional current image data are inputted to a position matching image obtaining means from the reducing means. After the reduced three-dimensional image data has been subjected to a three-dimensional affine transform by the position matching image obtaining means, a two-dimensional past image data having a high correlation with the reduced two-dimensional present image is obtained utilizing a projection transform by perspective projection.

17 Claims, 2 Drawing Sheets

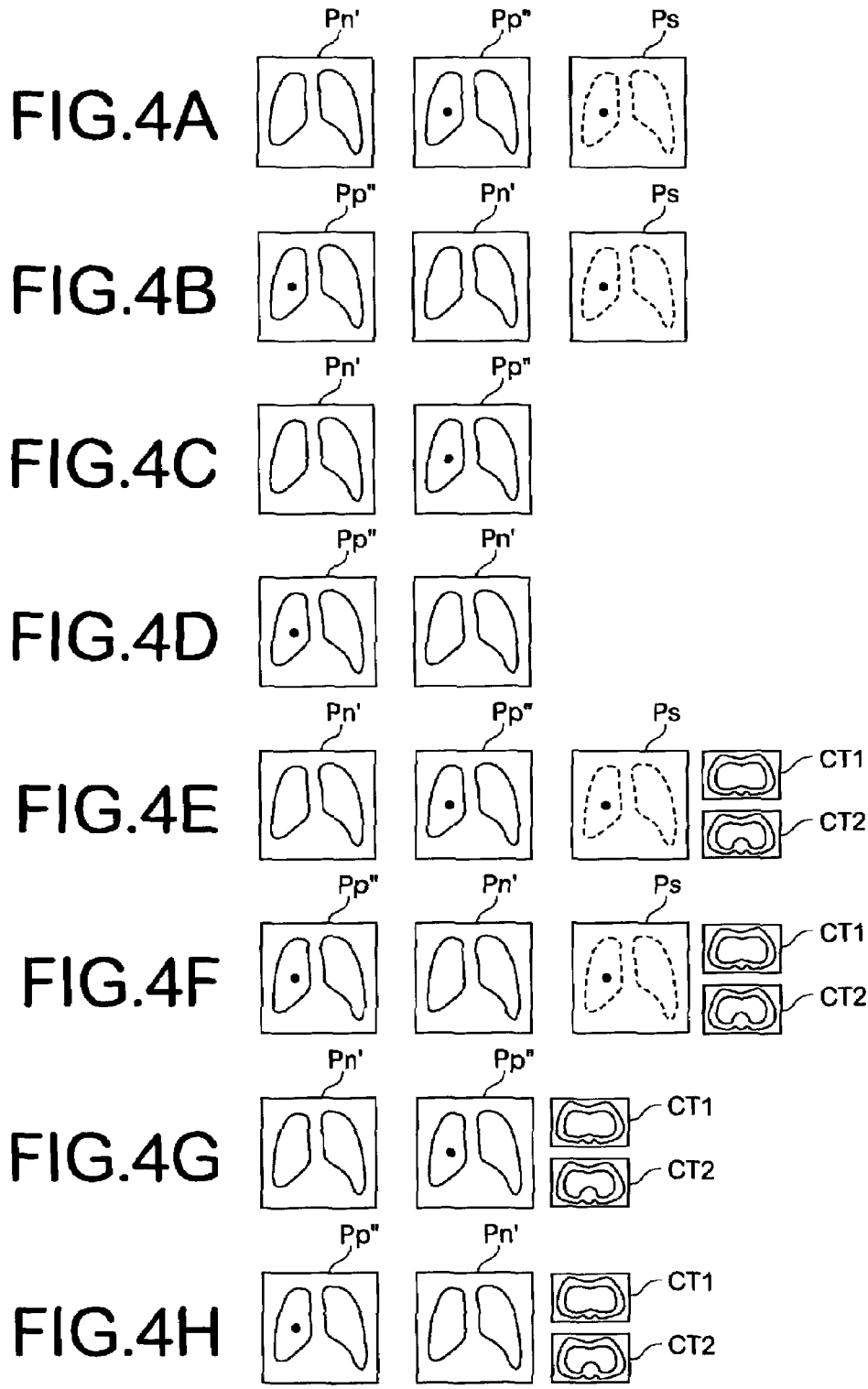

IMAGE POSITION MATCHING APPARATUS AND IMAGE PROCESSING APPARATUS

BACKGROUND OF THE INVENTION

1. Field of the Invention

The present invention relates to an image position matching apparatus and an image processing apparatus, and in particular to an image position matching apparatus for matching the positions of two images obtained of the same subject and an image processing apparatus for matching the positions of two images obtained of the same subject and performing image processes utilizing said two images of which the positions thereof have been matched.

2. Description of the Related Art

It is a common practice in a wide variety of fields to read and compare a plurality of two or more images obtained of the same subject in order to discern the difference between the images, and carry out an inspection of the subject based on the thus discerned difference, etc.

In the industrial products manufacturing industry, for example, images taken of a product when it is new and images taken of the same product after it has been subjected to an endurance test are compared, and attention is focused on the area showing the biggest difference so that an examination as to whether or not there are areas requiring improvement in product endurance can be carried out. In the medical field, doctors read and compare a plurality of radiation images of the diseased part of a patient taken in a temporal series in order to ascertain the course of the disease and determine the proper treatment.

In this fashion, reading and comparison of a plurality of images is carried out daily in a wide variety of fields. To facilitate such comparative reading, the two or more images are outputted by a display means, a printer or the like as visible images. Although the area of the most interest to the viewer of such images is the area wherein the greatest difference is shown, when the two or more images that are to become objects of comparative reading are compared, it is a common practice to simply line them up and display them. However, the ability to accurately discern the difference differs according to the skill level and experience of the operator, and under such conditions, the smaller the difference between the images is, the more difficult it becomes to discern. Therefore, there is a desire for an improvement in comparative reading performance, which is not dependent on the skill level of the diagnostician.

In this regard, interimage computation technology has already been proposed, as in, for example, Japanese Unexamined Patent Publication No. 11(1999)-342900, wherein: first, the anatomically characteristic positions between the two images to be comparatively read are coordinated; next, the coordinated positions are subjected to a subtraction process to extract the difference between said two images; and the difference is enhanced to obtain a subtraction image representing the difference between the two images. By extracting and enhancing only the interimage difference as described above, because the diagnostician is therefore enabled to accurately discern the difference between the two images, it can be said that the overlooking of a diseased portion or the progress of the treatment and the like can be prevented.

Further, when this interimage computation is to be performed, it is necessary to coordinate and match the positions of the structural components (anatomically characteristic positions) appearing within each of the two images. Regarding technology for performing the position matching operation, there are known two-step position matching technologies such as those proposed in U.S. Pat. No. 5,982,915 and Japanese Unexamined Patent Publication No. 7(1995)-37074), wherein, for example: a global position matching (e.g., a linear position matching employing an affine transform or the like) comprising the performance of parallel movement and/or rotation, or an enlargement and/or reduction process between two images is carried out; a plurality of regions of interest (template regions), which are small regions, are set in one of the two images subjected to the global position matching, and search regions, which are larger than each template region, are set in the other of the two images subjected to the global matching so that a search region is set for each corresponding template region; the template region and the image of the corresponding search region are substantially matched for each pair formed of a template region and corresponding search region; the portion region (the corresponding template region) within each search region is obtained; based on the positional relation between each template region of the one image and each corresponding template region of the other image, the shift quantity required to match each template region occurring in the one image to each corresponding template region in the other image is obtained; based on the obtained shift quantity, the aforementioned two globally matched images are subjected to a local matching process employing a nonlinear transform (warping) by use of a curve fitting process (a two-dimensional n polynomial function, where n>2); whereby the corresponding positions of the two images are matched to a comparatively favorable degree.

When images of the same subject are obtained at different times, there are cases in which there is fluctuation in the position of the body of the subject. In particular, when radiation images of the chest portion of a human subject are obtained at periodic intervals in a temporal series, there are cases in which the standing position, the posture, orientation, and the like of the patient will vary from one image to another, as a result, when two two-dimensional transparency images that have been obtained of the same subject at different times are compared, there are cases in which the bone tissue such as the ribs, and soft tissue, such as blood vessels, respiratory tract and the like appearing therein will have been displaced in different directions. Conventionally, when the original images of two two-dimensional transparency images (or reduction images of the original images, blurred images of the original images, etc.) between which the bone tissue and soft tissue are displaced in different directions were utilized in performing a global position matching process such as that descried above, an image wherein global position matching has been performed with respect to the soft tissue had been obtained.

However, when images of which the soft tissue positions thereof have been globally matched are utilized in performing a local matching process such as that described above, there are cases in which a rib appearing within a template region is not present in the corresponding search region. As a result, exceptionally large artifacts caused by positional misalignment occur within a subtraction image formed by a local matching process using the rib as the index, making it difficult to see the difference (diseased portion or the like) between the two images.

In response to this problem, there has been proposed in Japanese Patent Application Nos. 2001-44623 and 2001-129554 image position matching technology wherein images in which specific structural elements have been emphasized are utilized in a position matching process to match the positions of specified structural elements common to the images. If this technology is employed, by utilizing images in which the bone tissues have been emphasized, it becomes possible to obtain images of which the bone tissues have been globally matched, the number of artifacts appearing in a subtraction image obtained therebetween is reduced, and a diseased portion present in the connective tissue can be extracted with a high degree of accuracy.

However, if the positions of the bone tissues are matched between two two-dimensional transparency images in which the respective position of the body of the subject was different at the time of photographing, the accuracy with which the positions of the soft tissue are matched decreases, and it therefore becomes difficult to visually detect within the subtraction image the presence of a diseased portion in the soft tissue. That is to say, when there has been fluctuation in the position of the subject at the respective times of photographing, there is a limit to the degree to which the positions thereof can be matched, and it has proven difficult to match the positions of all structural elements common to the images.

On the other hand, along with an improvement in imaging technology, it has become possible to obtain three-dimensional transparency images, by use of a CT apparatus, an MRI apparatus or the like. Although there are cases in which it is desired to compare such a three-dimensional transparency image with a two-dimensional transparency image obtained in the past to observe the change over the course of time, if there has been fluctuation in the position of the body of the subject at the respective times of photographing, this comparison cannot be effectively performed. Further, from the standpoint of cost, it is advantageous to first obtain a three-dimensional transparency image and obtain for the second and subsequent images the comparatively less costly two-dimensional transparency image.

SUMMARY OF THE INVENTION

The present invention has been developed in view of the forgoing circumstances, and it is an objective of the present invention to provide an image position matching apparatus and an image processing apparatus capable of matching the positions of a three-dimensional transparency image and a two-dimensional transparency image, even for cases in which there is fluctuation in the position of the body of the subject when the respective images are obtained.

The image position matching apparatus according to the present invention is an image position matching apparatus comprising a position matching means for matching the positions of two images obtained of the same subject; wherein, the aforementioned two images consist of a two-dimensional transparency image and a three-dimensional transparency image, and the position matching means forms a two-dimensional projection image, which has a high degree of correlation to the two-dimensional transparency image, from the three-dimensional transparency image and matches the positions of the two-dimensional projection image and the two-dimensional transparency image.

Here, "forms a two-dimensional projection image, which has a high degree of correlation to the two-dimensional transparency image, from the three-dimensional transparency image" refers to the subjection of the three-dimensional transparency image to a projection transform to obtain a two-dimensional projection image. It is preferable that a perspective projection method be employed as the projection transform method.

Further, with regard to the method of forming a two-dimensional projection image having a high degree of correlation to the two-dimensional transparency image from the three-dimensional transparency image, a method, for example, wherein a three-dimensional transparency image is subjected to a three-dimensional angular transform, prior to the projection transform, so as to obtain a two-dimensional projection image having a high degree of correlation to the two-dimensional transparency image. A three dimensional affine transform may be utilized as the three dimensional transform process. A three-dimensional image obtained of a subject by a CT apparatus, an MRI apparatus or the like can be used as the three-dimensional transparency image. Alternatively, a three-dimensional transparency image having data relating to the depth of a subject can also be used thereas. Further, the referents of "two-dimensional transparency image" include radiation images obtained by imaging a subject employing radiation imaging techniques.

The image processing apparatus according to the present invention is an image processing apparatus comprising a position matching means for matching the positions of two images obtained of the same subject; and an image processing means for subjecting the two images of which the positions thereof have been matched by the position matching means to a predetermined image process; wherein, the aforementioned two images consist of a two-dimensional transparency image and a three-dimensional transparency image, and the position matching means forms a two-dimensional projection image, which has a high degree of correlation to the two-dimensional transparency image, from the three-dimensional transparency image and matches the positions of the two-dimensional projection image and the two-dimensional transparency image.

Here, a subtraction process, for example, may be used as the predetermined image process. Further, the two images obtained of the same subject can be images that have been obtained at different times in a temporal series.

Note that the position matching means of the image processing apparatus according to the present invention is the same as that employed in the above-described image position matching apparatus according to the present invention.

According to the image position matching apparatus of the present invention, because the process of matching the positions of the two-dimensional transparency image and the three-dimensional transparency image is performed by forming a two-dimensional projection image, which has a high degree of correlation to the two-dimensional transparency image, from the three-dimensional transparency image, even for cases in which there is fluctuation in the position of the body of the subject when the respective images are obtained, the positions of the two-dimensional transparency image and the three-dimensional transparency image can be matched.

That is to say, regarding a method, for example, wherein a three-dimensional transparency image is first subjected to a three-dimensional transform and then subjected to a projection transform, because a two-dimensional projection image having a high degree of correlation to the two-dimensional transparency image can be formed from the three-dimensional transparency image, even for cases in which there is fluctuation in the position of the body of the subject when the respective images are obtained, the positions of the two-dimensional transparency image and the three-dimensional transparency image can be matched without any adverse effect due to said fluctuation.

According to the image processing apparatus of the present invention, the process of matching the positions of the two-dimensional transparency image and the three-dimensional transparency image that have been obtained of the same subject is performed by forming a two-dimensional projection image, which has a high degree of correlation to the two-dimensional transparency image, from the three-dimensional transparency image, and the two-dimensional projection image and the two-dimensional transparency image are subjected to a predetermined image process; whereby, even for cases in which there is fluctuation in the position of the body of the subject when the images are obtained, it becomes possible to utilize two images of which the positions of all the common structural elements therebetween have been matched in performing the predetermined image process.

Note that if the predetermined image process is a subtraction process, because the subtraction process can be performed utilizing two images of which the positions of the common structural elements common therebetween have been matched, it becomes possible to reduce the number of artifacts appearing within the subtraction image, and the difference between the two images can be extracted and thereby rendered readily visible, regardless of the position within the image at which said difference is present.

BRIEF DESCRIPTION OF THE DRAWINGS

FIGS. 4A to 4H are drawings of examples of a format of displaying images according to the present invention.

DESCRIPTION OF THE PREFERRED EMBODIMENTS

Figure 1:
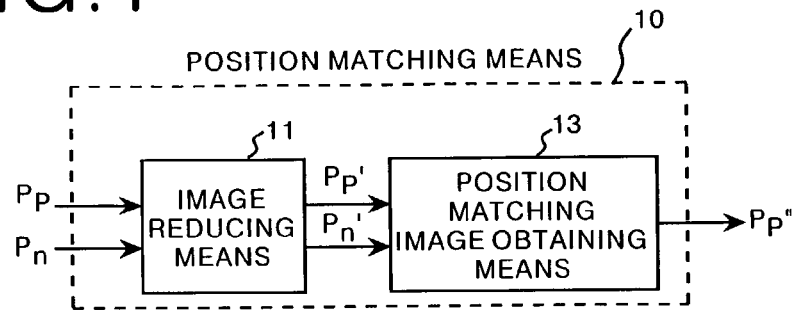
FIG. 1 is a block diagram of an embodiment of the image position matching apparatus of the present invention.

Hereinafter the preferred embodiments of the image position matching apparatus according to the present invention will be explained with reference to the attached drawings. FIG. 1 is a schematic drawing of the main portion of an embodiment of the image position matching apparatus according to the present invention.

The position matching means 10 of the image position matching apparatus according to the current embodiment comprises: an image reducing means 11, into which a two-dimensional present image data Pn and a three-dimensional past image data Pp are inputted, that forms a ⅒ reduced image data of each said inputted image data; and a position matching image obtaining means 13, into which the reduced two-dimensional present image data Pn' and the reduced three-dimensional past image data Pp' formed by the image reducing means 11 are inputted, that subjects the reduced three-dimensional past image data Pp' to a three-dimensional coordinate moving process, by use of a three-dimensional affine transform, and then performs a projection transform, by use of a perspective projection process, to obtain a two-dimensional past image data Pp".

The three-dimensional past image data Pp inputted to the position matching means 10 is an image data representing a three-dimensional chest transparency image obtained by a CT apparatus, and has been obtained at an earlier point in a temporal series than the two-dimensional present image data Pn. Further, the two-dimensional present image data Pn is an images data representing a two-dimensional chest transparency image obtained by a conventional radiation image obtaining technology.

Next, the operation of the image position matching apparatus according to the current embodiment will be explained.

When the two-dimensional present image data Pn and the three-dimensional past image data Pp are inputted to the position matching means 10, the two image data Pn and Pp are inputted to the image reducing means 11, wherein each said inputted image data are reduced to a ⅒ reduced image data.

The reduced two-dimensional present image data Pn' and the reduced three-dimensional past image data Pp' formed by the image reducing means 11 are inputted to the position matching image obtaining means 13. The position matching image obtaining means 13 first subjects the reduced three-dimensional past image data Pp' to a three-dimensional transform process by use of a three-dimensional affine transform.

The three-dimensional affine transform consists of subjecting the image data to a reduction, rotation, parallel movement, etc., transform process. By varying the value of twelve affine transform coefficients while performing the affine transform, the rate of reduction or expansion, the rotation angle, the quantity of parallel movement, etc., can be varied. Here, combinations of coefficients corresponding to the basic three-dimensional fluctuations of the position of the body of the human patient (forward lean, backward lean, lateral bend, lateral twist) are prepared in advance. The transform process (hereinafter referred to as a standard transform process) according to the aforementioned combination are performed on the three-dimensional past image data Pp'.

Figure 2:
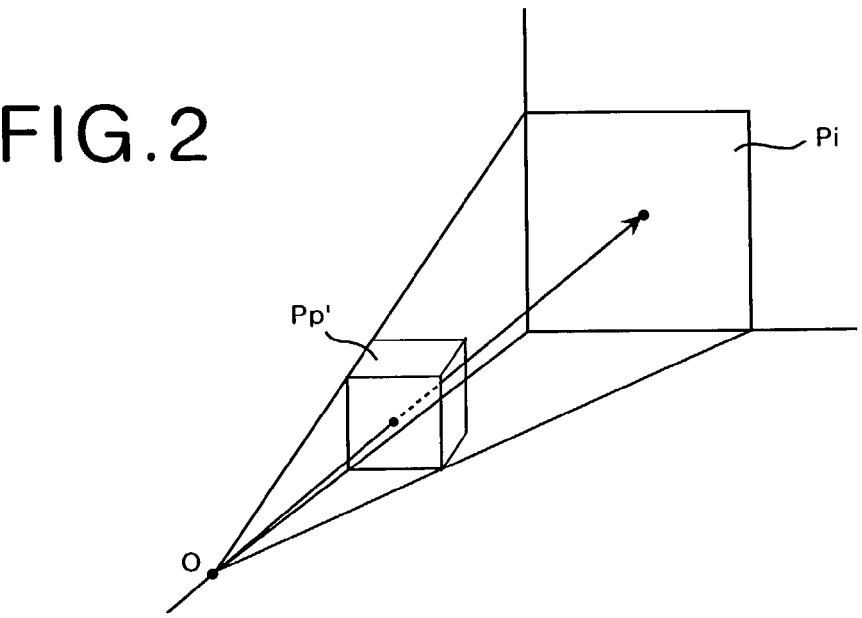
FIG. 2 is a drawing illustrating the concept of the projection transform by perspective projection of the reduced three-dimensional past transparency shadow image Pp'.

The reduced three-dimensional past image data Pp' subjected to the standard transform process is useful in performing the projection transform process by perspective projection. The referent of "projection transform" is the projecting onto a two-dimensional flat surface of a three-dimensional image represented by a three-dimensional image data so as to convert the three-dimensional image data to a two-dimensional image data. Further, "perspective projection" refers to a projection method having a property close to that characteristic of the human perceptual faculties to see near objects as large objects and distant objects as small objects, whereby two parallel lines are seen as converging on a single point on the horizon. FIG. 2 is a drawing illustrating the concept of a projection transform by perspective projection. As shown in FIG. 2, the by perspectively projecting the reduced three-dimensional past image data Pp', (for the sake of simplicity, the image data and the image represented thereby will hereinafter be labeled and explained with reference to the same reference numeral) from a projection center 0 to a two-dimensional flat surface, a two-dimensional projection image Pi of the reduced three-dimensional past image data Pp' is obtained. At this time, the pixel value of each pixel of the two-dimensional past image Pi is taken as the total (or average, etc.) of the pixel values of the depth direction (projection direction) of the reduced three-dimensional image data Pp'.

By use of a method such as that described above, the position matching image obtaining means 13 obtains a two-dimensional projection image data Pi based on the reduced three-dimensional past image data Pp' that has been subjected to the standard transform process. Further, by subjecting, while varying the value of the twelve coefficients, the reduced three-dimensional past image data Pp' to a sequential transform process by use of a three-dimensional affine transform, a two-dimensional projection image data P2~PN can be obtained of each transform processed reduced three-dimensional past image data Pp'; the correlative values of each two-dimensional projection image data Pi (i=1–N) and the reduced two-dimensional present image data Pn' can be computed and the two-dimensional projection image data Pi having the highest degree of correlation to the reduced two-dimensional present image data Pn' can be obtained as a two-dimensional past image data Pp".

According to the image position matching apparatus of the present embodiment: a reduced three-dimensional past image data Pp' is subjected to an affine transform, while the values of twelve coefficients are sequentially varied; a projection transform is performed for each affine transform to obtain a respective two-dimensional projection image data Pi; each two-dimensional projection image data Pi is compared to the reduced two-dimensional present image data Pn'; and the two-dimensional projection image data Pi having the highest degree of correlation to the reduced two-dimensional present image data Pn' is obtained as a two-dimensional past image data Pp"; whereby, even for cases in which there is fluctuation in the position of the body of the subject when the respective images are obtained, it is possible to match the positions of all structural elements common to images with no adverse effect due to the direction of said fluctuation, the magnitude of said fluctuation, etc.

Note that although the above-described embodiment has been explained using an example of a method wherein two image data, Pn' and Pp', which have been reduced by the image reducing means 11, have been utilized in performing a sequence of processes when a positions matched image is to be obtained, the present invention is not limited to said embodiment. An embodiment wherein: the correlative values can be obtained while varying the values of the affine transform coefficients; the process for deriving the coefficients of the affine transform is performed only on the reduced image data having the highest correlation value; and the process of performing a projection transform by perspective projection based on the obtained affine transform coefficient, to obtain a positions matched image, is performed only on the non-reduced image data is possible.

Further an embodiment is possible wherein: when the position matching image obtaining means 13 obtains a two-dimensional projection image data Pi by perspective projection, the opacity rate of the bone tissue portions is varied so as to differ from that of the other portions, then weighted, and the total thereof obtained; and a two-dimensional projection image Pi is formed based on the weighted total obtained thereby. That is to say, there is a strong possibility that a radiation employed by a CT apparatus and that employed by a standard radiation imaging apparatus have different radiation properties; when a perspectively projection image is formed by simply taking the total (or average) of the pixel value of the CT image in the depth direction thereof (the CT value), because the ratio of the pixel values (density) of the bone tissue portions to the soft tissue portions differs from that of a standard radiation image, as described above, it is desirable that a density corrected projection image be formed by changing the transmission ratio of the bone tissue portions (ribs), for example. Hereinafter, a specific embodiment thereof will be explained.

When a two-dimensional projection image of a three-dimensional CT image to be formed by use of a standard perspective projection method employing, for example, the following formula:

$$(v_1+v_2+\ldots v_N)/N$$

the average of the pixel values (CT values) along the direction of the same line of sight (the line formed by the same x, y coordinates of a two-dimensional image that has been subjected to a projection process) can be obtained and taken as the pixel value of the x, y coordinates of a two-dimensional projection image. Here, $v_1 \sim v_N$ are the CT values of each respective depth position of the CT image (the positions obtained by dividing the depth along the direction of the same line of sight into N positions).

On the other hand, when a two-dimensional projection image Pi is to be formed by use of a weighted total: first, a two-dimensional image is formed, by use of an MIP method, utilizing the largest CT value occurring along the direction of the same line of sight of a three-dimensional CT image; and by subjecting the formed two-dimensional image to a fixed threshold process to extract the low density portions, the rib portions, which are represented within the image by low density portions, are extracted. At this time, by recording the depth position of the largest CT value, which has been utilized in forming the two-dimensional image by use of an MIP method, the depth positions at which connective tissue portions are present can be roughly specified. Note that the thorax region can be discriminated in advance by use of a method such as that described in Japanese Unexamined Patent Publication No. 2000-298100, or the like; if the rib portions are extracted only from within the thorax region, the accuracy with which the rib portions are extracted can be improved.

Next, designating the depth positions at which rib portions are present as j, the pixel value of each set of coordinates of a two-dimensional projection image formed by use of a weighted total are obtained employing the following formula:

$$(\alpha_1 v_1 + \alpha_2 v_2 + \ldots + \alpha_j v_j + \ldots + \alpha_N v_N)/(\alpha_1 + \alpha_2 + \ldots \alpha_N)$$

Here, $\alpha_1 - \alpha_N$ are the opacity rates, and only the value $\alpha_j$ is varied in accordance with the degree of density correction. For example, to cause the rib portions present in the image to have a lower density, the value of $\alpha_j$ can be made larger than the other values; to assign the rib portions a higher density, the value of $\alpha_j$ can be made smaller than the other values. Note that because the thickness of the ribs is substantially uniform, the depth positions j can also be changed appropriately in relation to the size of the image.

According to the method described above, by varying only the opacity rate of the connective tissue portions, because a two-dimensional projection image has a bone- to soft-tissue portions' density ratio the same as that of a radiation image, a two-dimensional past image data Pp" having a higher degree of correlation that that of the reduced two-dimensional present image data Pn' can be obtained. Note that the three-dimensional image utilized in the above-described method is not limited to being a CT image. Further, although in the embodiment described above, the opacity rate of the connective tissue portions has been varied, conversely, an embodiment wherein the opacity rates of the portions other than the connective tissues are varied is also possible.

Note that for cases in which the resolution, size and the like of the two-dimensional present image data Pn and the three-dimensional past image data Pp differ, it is desirable that preliminary processes that make the resolution, size and the like of the two image data the same be performed before the position matching process is performed.

Figure 3:
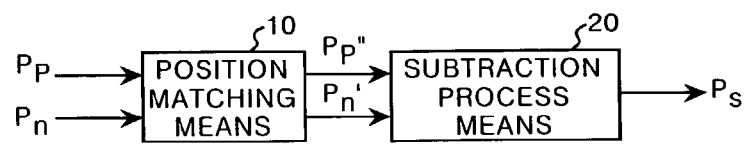
FIG. 3 is a block diagram of an embodiment of the image processing apparatus of the present invention.

Next, an embodiment of the image processing apparatus according to the present invention will be explained with reference to the drawings. FIG. 3 is a schematic drawing of the main part of an embodiment of the image processing apparatus according to the present invention. Note that elements common to the embodiment of the image position matching apparatus described above are likewise labeled, and in so far as it is not particularly required, further explanation thereof has been omitted.

The image processing apparatus according to the current embodiment comprises: a position matching means 10, into which a two-dimensional present image data Pn and a three-dimensional past image data Pp are inputted, for obtaining a 1/10 reduction image of the two-dimensional present image data Pn (a reduced two-dimensional present image data) Pn' and a reduced two-dimensional past image data Pp" of which the positions thereof have been matched to those of the reduced two-dimensional present image data Pn; and a subtraction process means 20, into which the reduced two-dimensional present image data Pn' and the two-dimensional past image data Pp" are inputted from the position matching means 10, for performing a subtraction process utilizing said two inputted image data to obtain a subtraction image Ps.

Next, the operation of the image processing apparatus according to the current embodiment will be explained.

The subtraction process means 20, into which the reduced two-dimensional present image data Pn' and the two-dimensional past image data Pp" that have been reduced by the position matching means 10 have been inputted therefrom, coordinates the pixels of the image data Pn' and Pp" and performs an interimage computation process therebetween to form a subtraction image data Ps. The subtraction image data Ps can be formed by use of an interimage computation employing, for example, a formula such as:

$Ps = a1 \cdot Pn' - a2 \cdot Pp''$ (where $a1$, $a2$ are constants)

or the like. Further, as shown in the formula below, because portions in which there is no difference between the two images are reproduced by use of an intermediate value (intermediate density, intermediate brightness, etc.), it is preferable that a uniform value (intermediate value mid=512 for a 10-bit image data) is added and that the contrast of the difference is adjusted.

$Ps = (a1 \cdot Pn' - a2 \cdot Pp'') \times \text{cont} + \text{mid}$

Here, cont is a constant representing a contrast coefficient, and mid is a constant representing an intermediate value.

According to the image processing apparatus of the current embodiment, because a subtraction process is performed utilizing the reduced two-dimensional present image data Pn' and the two-dimensional past image data Pp" of which the positions of all the structural elements common thereto have been matched, the number of artifacts appearing with the subtraction image can be reduced, and the difference between the two images becomes easy to discriminate visually.

Further, the position matching means 10 can also be provided in the form of an embodiment wherein a two-dimensional projection image Pi is formed by use of a weighted total in the same manner as described above for the image position matching apparatus. In this fashion, because the subtraction process can be performed utilizing two images of which the correlation between the densities and positions therebetween is higher, the artifacts appearing within the subtraction image can be further reduced.

Note that, although according to the image processing apparatus of the above-described embodiment the subtraction image data Ps has been formed utilizing, in the form in which the image data were inputted, the reduced two-dimensional present image data Pn' and the two-dimensional past image data Pp" formed by the position matching means 10, an embodiment is also possible wherein: a local position matching means for performing a conventional local position matching process (setting template regions and search regions in the two images, respectively, obtaining the quantity of shift between corresponding regions, and performing a local position matching by use of a warping process) to locally match the positions of the reduced two-dimensional present image data Pn' and the two-dimensional past image data Pp" formed by the position matching means 10 is further provided; the two image data of which the positions thereof have been locally matched by the local position matching means are inputted to the subtraction means 20; and the subtraction means 20 coordinates the pixels of said inputted image data and performs the subtraction process to form a subtraction image data.

Further, the reduced two-dimensional present image data Pn' and the two-dimensional past image data Pp" (or the two-dimensional present image data Pn) formed by the position matching means 10 of the above-described embodiments can be outputted and displayed, side by side, for example, on a display apparatus or the like, whereupon a comparative reading of the images can be performed. Still further, the subtraction image Ps can also be displayed therewith. 1~4 of FIG. 4 show forms in which the present image Pn' (or Pn), the past image Pp", and the subtraction image Ps can be arranged and displayed. Also, as shown in 5~8 of FIG. 4, CT slice images CT1 and CT2 can also be arranged and displayed simultaneously. An embodiment, for example, wherein a position on the subtraction image at which a change has been observed can be indicated by use of a mouse or the like, and the corresponding CT slice image displayed is also possible.

Note that, although according to the above described-embodiments, an explanation has been proffered wherein the present image has been a two-dimensional image, and the past image, which has been obtained at an early point in a temporal series, is a three-dimensional image, the present invention is not limited to said embodiments; a reverse embodiment, that is, an embodiment wherein a two-dimensional image is used as the past image is and a three-dimensional image is used as the present image is also possible. Further, although an example has been proffered wherein the position matching means 10 reduces the three-dimensional past image data Pp and the two-dimensional present image data Pn, and the position matching process and interimage computations are performed based on the reduced image data, in order to reduce the processing time, an embodiment wherein the image data are not reduced and each process is performed thereon is also possible.

What is claimed is:

1. An image position matching apparatus comprising:
a position matching means for matching the positions of two images obtained of a subject,
wherein said two images consist of a two-dimensional transparency image and a three-dimensional transparency image, and
the position matching means forms, from the three-dimensional transparency image, a two-dimensional projection image, which has a high degree of correlation to the two-dimensional transparency image, and matches the positions of said formed two-dimensional projection image and the two-dimensional transparency image,
wherein the position matching means includes a compensating means to correct for deformation of the subject occurring between recording of the three dimensional transparency image and the two-dimensional transparency image, wherein the deformation of the subject is corrected by deforming the three-dimensional transparency image before the position matching means forms the two dimensional projection image.

2. The image position matching apparatus of claim 1, wherein the position matching means further comprises a density correcting means used to form the two-dimensional projection image.

3. The image position matching apparatus of claim 1, wherein the position matching means further comprises an image reducing means for obtaining a reduction image of the two-dimensional transparency image and the three-dimensional transparency image.

4. The image position matching apparatus of claim 1, wherein the position matching means comprises a non-orthogonal affine transformation.

5. The image processing apparatus of claim 1, wherein the local position matching means matches the local positions using a warping process.

6. The image processing apparatus of claim 1, wherein the local position matching means sets a first template region in the two dimensional projection image and a second template region in the two dimensional transparency image, obtains the quantity of shift between the first template region and the second template region, and performs local matching by warping at least one of the first template region and the second template region.

7. The image position matching apparatus according to claim 1, wherein the three-dimensional transparency image is deformed using an three-dimensional affine transformation based on predetermined fluctuations of a position of a subject.

8. The image position matching apparatus according to claim 7, wherein three-dimensional affine transformation coefficients are varied to deform the three-dimensional transparency image to produce a plurality of two-dimensional projection images and one of the plurality of two-dimensional projection images having a highest degree of correlation to the two-dimensional transparency image is selected to have a position matching the two-dimensional transparency image.

9. An image processing apparatus comprising:

a position matching means for matching the positions of two images obtained of a subject, and an image processing means for subjecting the two images of which the positions thereof have been matched by the position matching means to a predetermined image process, wherein said two images obtained of the same subject matter consist of a two-dimensional transparency image and a three-dimensional transparency image, and the position matching means forms a two-dimensional projection image, which has a high degree of correlation to the two-dimensional transparency image, from a the three-dimensional transparency image, and matches the positions of said formed two-dimensional projection image and the two-dimensional transparency image, wherein the position matching means includes a compensating means to correct for deformation of the subject occurring between recording of the three dimensional transparency image and the two-dimensional transparency image, wherein the deformation of the subject is corrected by deforming the three-dimensional transparency image before the position matching means forms the two dimensional projection image.

10. An image processing apparatus as defined in claim 9, wherein the predetermined image process is a subtraction process.

11. The image processing apparatus of claim 9, wherein the position matching means further comprises a density correcting means to form the two-dimensional projection image.

12. The image processing apparatus of claim 9, wherein the position matching means further comprises an image reducing means for obtaining a reduction image of the two-dimensional transparency image and the three-dimensional transparency image.

13. The image processing apparatus of claim 9, wherein the position matching means comprises a non-orthogonal affine transformation.

14. The image processing apparatus of claim 9, wherein the local position matching means matches the local positions using a warping process.

15. The image processing apparatus of claim 9, wherein the local position matching means sets a first template region in the two dimensional projection image and a second template region in the two dimensional transparency image, obtains the quantity of shift between the first template region and the second template region, and performs local matching by warping at least one of the first template region and the second template region.

16. The image position matching apparatus according to claim 9, wherein the three-dimensional transparency image is deformed using an three-dimensional affine transformation based on predetermined fluctuations of a position of a subject.

17. The image position matching apparatus according to claim 16, wherein three-dimensional affine transformation coefficients are varied to deform the three-dimensional transparency image to produce a plurality of two-dimensional projection images and one of the plurality of two-dimensional projection images having a highest degree of correlation to the two-dimensional transparency image is selected to have a position matching the two-dimensional transparency image.

* * * * *